(12) United States Patent
Weedon

(10) Patent No.: US 8,138,967 B2
(45) Date of Patent: Mar. 20, 2012

(54) MULTILATERATION SYSTEM AND METHOD

(75) Inventor: Robert J. Weedon, Southhampton Hampshire (GB)

(73) Assignee: Roke Manor Research Limited, Hampshire (GB)

( * ) Notice: Subject to any disclaimer, the term of this patent is extended or adjusted under 35 U.S.C. 154(b) by 207 days.

(21) Appl. No.: 12/429,564

(22) Filed: Apr. 24, 2009

(65) Prior Publication Data

US 2009/0303102 A1    Dec. 10, 2009

(30) Foreign Application Priority Data

Apr. 26, 2008 (GB) .................................... 0807586.3
Jul. 3, 2008 (GB) .................................... 0812096.6

(51) Int. Cl.
*G01S 13/06* (2006.01)
*G01S 3/02* (2006.01)
*G01S 13/00* (2006.01)

(52) U.S. Cl. .............. 342/126; 342/36; 342/37; 342/38; 342/118; 342/175; 342/195; 342/450; 342/451; 342/463; 342/464; 342/465

(58) Field of Classification Search .............. 342/29–51, 342/118, 126, 175, 195, 450–465, 27, 28, 342/59, 125, 123, 145, 385–416; 73/73; 367/118; 375/259

See application file for complete search history.

(56) References Cited

U.S. PATENT DOCUMENTS

| | | | | |
|---|---|---|---|---|
| 3,659,085 A * | 4/1972 | Potter et al. | .................... | 342/456 |
| 5,119,104 A * | 6/1992 | Heller | .......................... | 342/450 |
| 5,144,315 A * | 9/1992 | Schwab et al. | .................. | 342/49 |
| 5,179,384 A * | 1/1993 | De Haan | .......................... | 342/37 |
| 5,191,342 A * | 3/1993 | Alsup et al. | .................... | 342/465 |
| 5,208,756 A * | 5/1993 | Song | .............................. | 342/457 |
| 5,216,429 A * | 6/1993 | Nakagawa et al. | ............. | 342/45 |
| 5,227,803 A * | 7/1993 | O'Connor et al. | ............ | 342/456 |
| 5,235,341 A * | 8/1993 | Effland et al. | ................. | 342/460 |
| 5,365,516 A * | 11/1994 | Jandrell | ........................ | 342/457 |
| 5,717,406 A * | 2/1998 | Sanderford et al. | ......... | 342/457 |
| 5,917,449 A * | 6/1999 | Sanderford et al. | ......... | 342/457 |
| 5,995,046 A * | 11/1999 | Belcher et al. | ................ | 342/450 |
| 5,999,116 A * | 12/1999 | Evers | ............................. | 342/36 |
| 5,999,131 A * | 12/1999 | Sullivan | ....................... | 342/465 |
| 6,127,976 A * | 10/2000 | Boyd et al. | ..................... | 342/463 |
| 6,211,811 B1 * | 4/2001 | Evers | ............................. | 342/36 |
| 6,384,783 B1 * | 5/2002 | Smith et al. | ................... | 342/387 |
| 6,448,929 B1 * | 9/2002 | Smith et al. | ................... | 342/456 |
| 6,608,593 B2 * | 8/2003 | Holt | ............................. | 342/453 |
| 6,853,687 B2 * | 2/2005 | Harrington et al. | .......... | 375/259 |
| 7,126,534 B2 * | 10/2006 | Smith et al. | ................... | 342/456 |
| 7,132,982 B2 * | 11/2006 | Smith et al. | ................... | 342/456 |
| 7,375,683 B2 * | 5/2008 | Smith et al. | ................... | 342/387 |

(Continued)

FOREIGN PATENT DOCUMENTS

EP    1 884 908 A2    2/2008

(Continued)

*Primary Examiner* — Bernarr Gregory

(74) *Attorney, Agent, or Firm* — Banner & Witcoff, Ltd.

(57) ABSTRACT

A multilateration system and method includes a plurality of receiver stations for receiving signals from an aircraft, and a controller that derives the position of the aircraft by applying a multilateration process to outputs from the receiver stations. For this purpose, the controller determines the altitude of the aircraft and selects a multilateration process that is to be used for position determination, based on the determined altitude.

13 Claims, 6 Drawing Sheets

U.S. PATENT DOCUMENTS

| | | | |
|---|---|---|---|
| 7,429,950 B2 * | 9/2008 | Smith et al. | 342/456 |
| 7,557,754 B2 * | 7/2009 | Thomas | 342/465 |
| 7,570,194 B2 * | 8/2009 | Galati | 342/30 |
| 7,570,195 B2 * | 8/2009 | Bartolini et al. | 342/37 |
| 7,570,214 B2 * | 8/2009 | Smith et al. | 342/463 |
| 7,576,695 B2 * | 8/2009 | Smith et al. | 342/465 |
| 7,612,716 B2 * | 11/2009 | Smith et al. | 342/454 |
| 7,667,647 B2 * | 2/2010 | Breen et al. | 342/450 |
| 7,724,610 B2 * | 5/2010 | Supino et al. | 367/118 |
| 7,777,675 B2 * | 8/2010 | Smith et al. | 342/463 |
| 7,782,256 B2 * | 8/2010 | Smith | 342/453 |
| 7,830,308 B2 * | 11/2010 | Brandwood et al. | 342/465 |
| 7,876,259 B2 * | 1/2011 | Schuchman | 342/37 |
| 7,928,908 B2 * | 4/2011 | Fisher et al. | 342/465 |
| 2004/0189521 A1 | 9/2004 | Smith et al. | |
| 2006/0191326 A1 * | 8/2006 | Smith et al. | 73/73 |
| 2008/0042902 A1 * | 2/2008 | Brandwood et al. | 342/465 |

FOREIGN PATENT DOCUMENTS

| | | |
|---|---|---|
| GB | 2 250 154 A | 5/1992 |
| GB | 2 349 531 A | 11/2000 |
| GB | 2 427 973 A | 1/2007 |
| WO | WO 98/05977 | 2/1998 |

* cited by examiner

| Mode A ID | Mode C altitude | Mode SAA | X | Y | Z |
|---|---|---|---|---|---|
|  |  |  |  |  |  |

Height & Range error correlation

3D

--------------------------------- $h_{3D}$

2D-Assisted (provided height)

--------------------------------- $h_{min}$

2D Only (zero height)

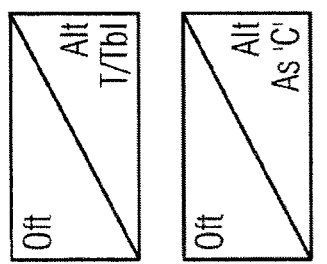

If altitude is:
- Between $h_{min}$ and $h_{3D}$ perform 2D-A with altitude in track table – mark as reduced accuracy
- Below $h_{min}$ use zero height – mark as full accuracy
- Above $h_{3D}$ no output from locator If altitude is:
- Between $h_{min}$ and $h_{3D}$ perform 2D-A with altitude as per Mode C' – mark as reduced accuracy
- Below $h_{min}$ use zero height – mark as full accuracy
- Above $h_{3D}$ no output from locator Perform 2D-0 calculation, mark as not to be output from system (used for plot association only)

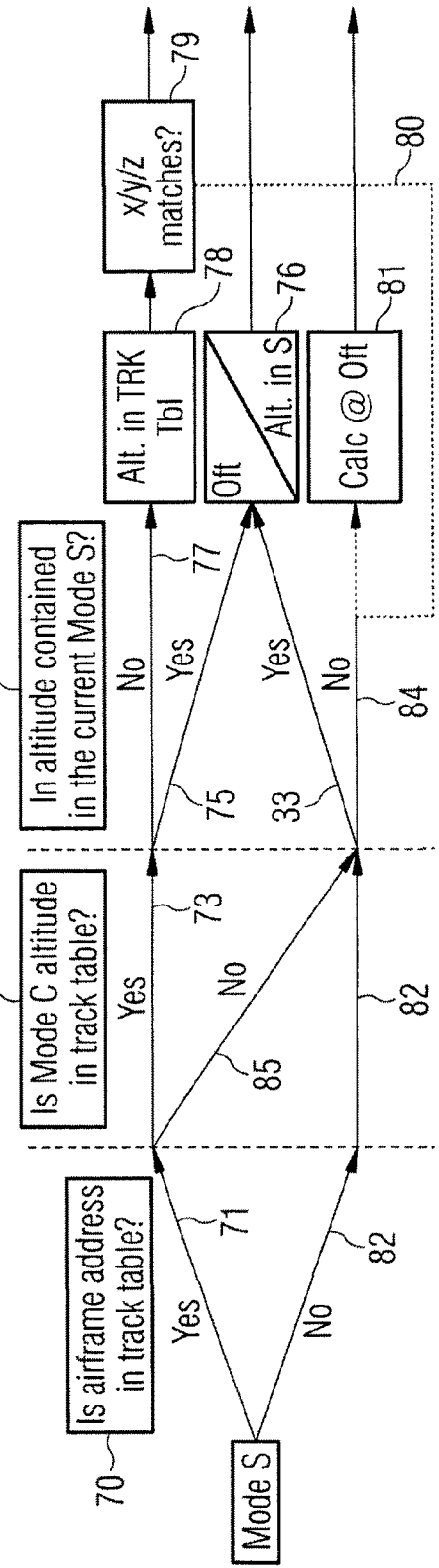

Case 1 - Mode S

Case 2- Mode A

Case 3- Mode C

Case 4- Mode A or C (unknown)

MULTILATERATION SYSTEM AND METHOD

This invention relates to a multilateration system for aircraft location.

BACKGROUND OF THE INVENTION

Many types of aircraft transmit coded signals for example Secondary Surveillance RADAR (SSR) codes such as a so-called mode A, C or S codes which may be used by ground based receivers to determine the aircraft's position. The position is determined from noting the time of arrival at the receivers and by using this with knowledge of the positions of the receivers themselves. GB2250154A and GB 2349531A disclose such multilateration systems. These systems utilise four receiver stations controlled from one master station in order to establish the aircraft's position in three dimensions.

SUMMARY OF THE INVENTION

The present invention arose from a consideration of situations when one receiver station fails to receive the transmitted code, the code is garbled or when one receiver station develops a fault. Consideration was also given to situation where aircraft are unable to transmit mode A codes.

According to the invention there is provided a multilateration system comprising a plurality of receiver stations for receiving signals from aircraft and a controller to apply a multilateration process to'outputs of the receiver stations, indicating receipt of the signal, to derive a position of the aircraft characterised in that the controller determines the number of active receiver stations receiving the code, determines the type of code and performs a multilateration process in accordance with the determination to provide a position of the aircraft.

In certain situations it will be appreciated that there may be insufficient receiver stations receiving the transmitted code to determine the location with a great deal of accuracy. For example, three receiver stations will be able to provide a two dimensional position which may in some circumstances be useful.

Some aircraft are equipped with mode A SSR transponder but are able to transmit other codes for example mode C. Mode A codes include a unique aircraft identifier and thus can distinguish a mode A code transmitted by one aircraft from second mode A code transmitted by another. In some cases the mode A transmission may be corrupted and hence not usable. Other codes may not include such a unique identifier. Preferably, in such a case the multilateration process will include a reference to tracking system to distinguish between possible sources. In the tracking system, a table is produced on the basis of the returned signals which is revised over time.

It will be appreciated that a multilateration process involves significant computational resources and it will be advantageous in some applications to perform the different multilateration processes available according to the accuracy required. Preferably, this is selected on the basis of the source aircraft's altitude. This has been found to be advantageous since the uncertainty in position in terms of ground position of the aircraft will increase with an increase in altitude. Hence, when the aircraft is at a high altitude full three dimensional multilateration will be required whereas at a relatively low altitude two dimensional multilateration will suffice. In the described embodiment, for heights between high and the low altitude thresholds a two dimensional multilateration is performed which is augmented with the altitude of the aircraft.

The transmitted code may include data concerning the altitude of the aircraft. This may be determined by the aircraft itself or by ground based means. In the case of Secondary Surveillance Radar (SSR) codes, a mode C code includes altitude information. In this case, the controller may perform a two dimensional multilateration process using some of the receivers and using the value of the altitude to arrive at a three dimensional location.

The invention also provides a multilateration method.

Other objects, advantages and novel features of the present invention will become apparent from the following detailed description of the invention when considered in conjunction with the accompanying drawings.

BRIEF DESCRIPTION OF THE DRAWINGS

FIG. 7a-7d show alternatives for decision logic according to the invention.

DETAILED DESCRIPTION OF THE DRAWINGS

Figure 1:
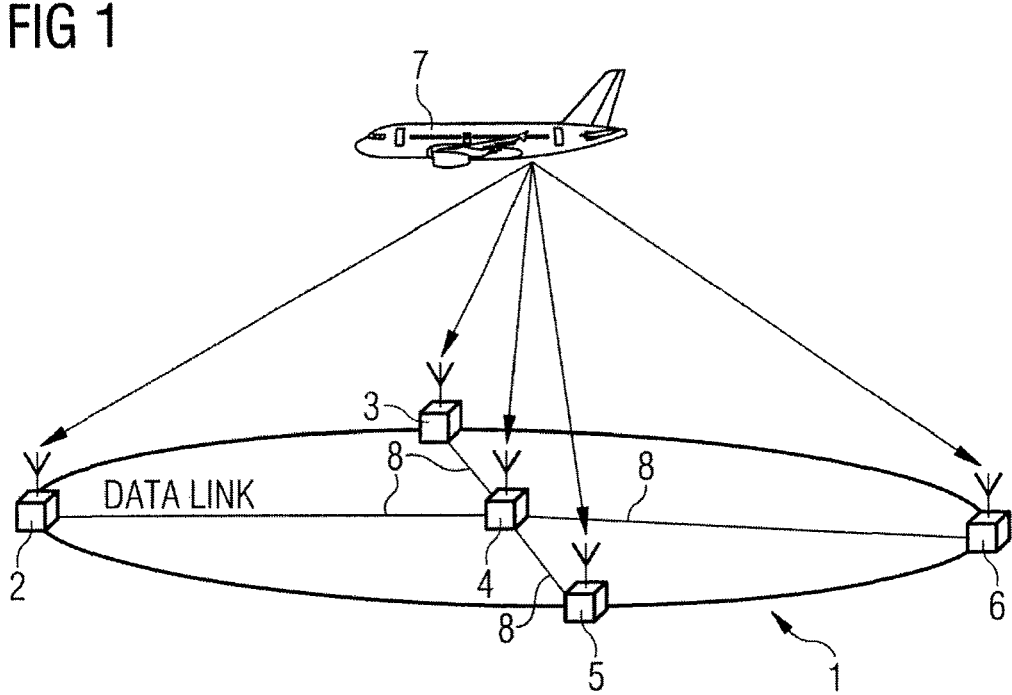
FIG. 1 shows in schematic form a multilateration system 1 operating in accordance with the invention.

As is shown in FIG. 1, a multilateration system 1 includes a plurality of receiver stations 2 to 6 positioned at a number of locations on the ground. These receive a transmitted signal include a code from a transponder mounted on an aircraft 7. The code is a Secondary Surveillance RADAR code which may be a mode A, mode S, mode C or may be an unknown mode of code.

Figure 2:
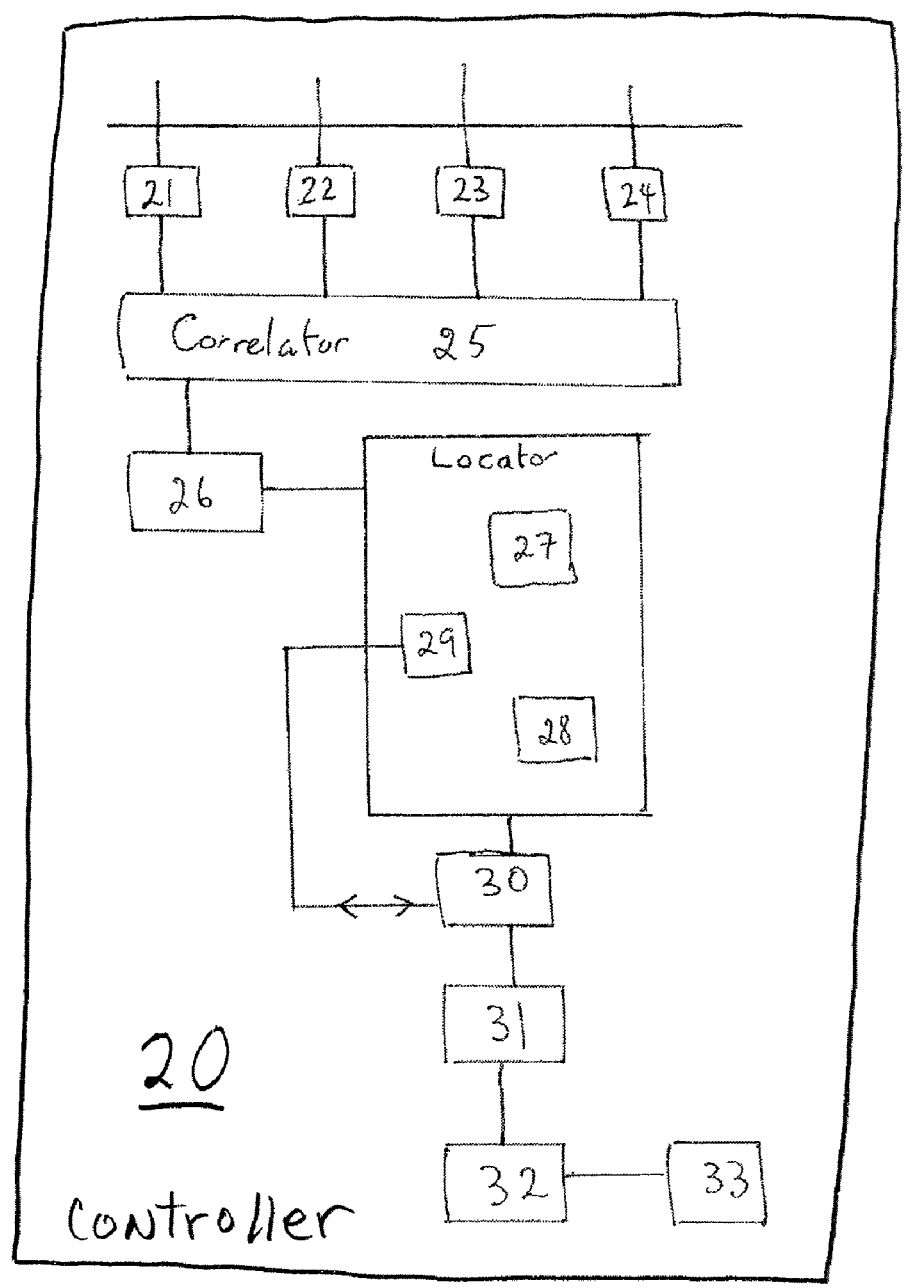
FIG. 2 is a block diagram of a controller for the multilateration system according to the invention.

Receiver station 4 is termed a master station because it includes a controller 20 which uses the data from the receivers to perform the multilateration process. (In alternative embodiments it need not be co-located with the receiver.) The data from the receiver stations 2, 3, 5 and 6 is passed to the master station 4 over data links 8. The controller 20 is microprocessor based and is shown in greater detail in FIG. 2. It includes a number of input ports 21 to 24 linked to the data links 8 and hence to the receiver stations. The input ports are connected to a correlator 25 which forms the data into sets which originate for particular transmissions of codes or events. The events are correlated by reference to time. Thus, if a mode A, mode C, mode S or an unknown mode code arrive within a certain time frame then they are considered to originate from the same aircraft. The correlator also ties up Time Of Arrival information from all receivers for a given transmission as a so-called TOA Vector which may be of arbitrary length dependent upon the receivers that received a particular emission of a code. The vectors are then stored in memory 26 as tables of times of arrival and associated codes.

Figures 3, 4, 5:
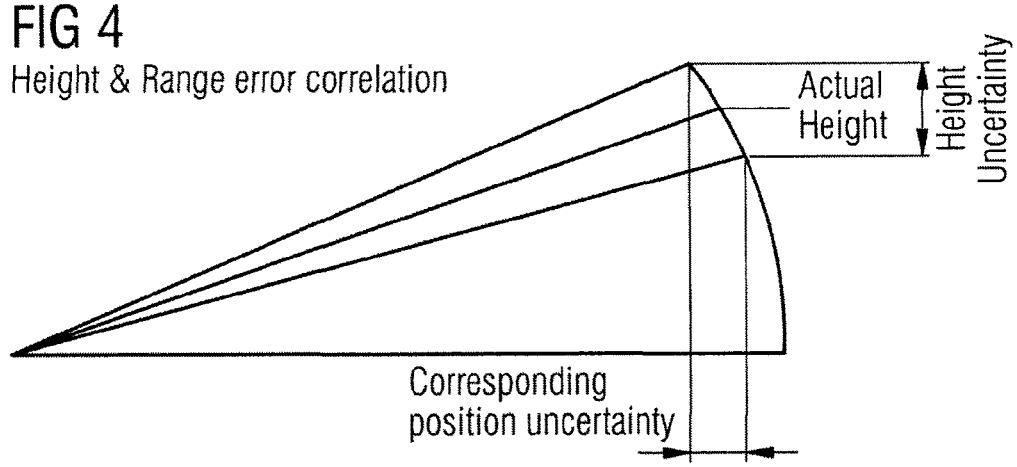
FIG. 3 shows a track table generated and stored by the controller of FIG. 2.
FIG. 4 is a diagram that shows altitude and range correlation error.
FIG. 5 is a graphic illustration of relationship between aircraft altitude and the selection of a multilateration process.

The vector held in the memory 26 is then accessed by a locator 27 that includes decision logic which analyses the data to determine for each vector a number of criteria, as will be described later, and then to select the appropriate multilateration process to be applied to the data. The vector together with an instruction as to the process to be applied is then passed to a multilateration processor 28 and the pertinent multilateration process applied. The position is then used to populate an entry in a track table 29. This is shown in FIG. 3. Each row of the table is a termed a "track" and includes the codes whether mode A, C or S Airframe Address, and a position expressed as co-ordinates x, y and z. The track table is accessible to a plot association block 30. This is able to associate different responses from the aircraft to form a single track entry in the track table 30 from multiple track entries.

The plot association block 30 provides an output to a formatter 31 which places the tracks into the correct format for input into a tracker system 32. The tracker system 32 provides an output to an air traffic control system 33 for displaying the tracks to a human air traffic control officer.

The selection criterion referred to above include the following:
1. Mode type, whether the received signal is mode A, S or C or an unknown mode.
2. Number of receiver stations providing data to the data set.
3. Whether the data indicates altitude or altitude is available from another system or altitude may be assumed.
4. Desired accuracy for the positioning The altitude may be determined in a number of ways. If the received code is mode C then this includes an altitude provided by the aircraft itself by use of an onboard altimeter for example. (In some embodiments, altitude may be provided from an earlier multilateration on the same aircraft or from knowledge of the aircrafts flight path which may require the use of a particular altitude for example.)

As is shown in explanatory FIG. 4, the aircraft's altitude has an uncertainty and this will translate to an uncertainty in the corresponding ground position. Arising from an appreciation of this, the inventors have determined that a satisfactory multilateration at low levels may be achieved by assuming that the aircraft is at zero altitude and co-planar with the receivers and hence a two dimensional multilateration process may suffice. For intermediate levels, a two dimensional multilateration augmented with altitude information may be used and a three dimensional multilateration using four or more receivers will be required at high altitudes. This banding is shown schematically in FIG. 5.

Figure 6:
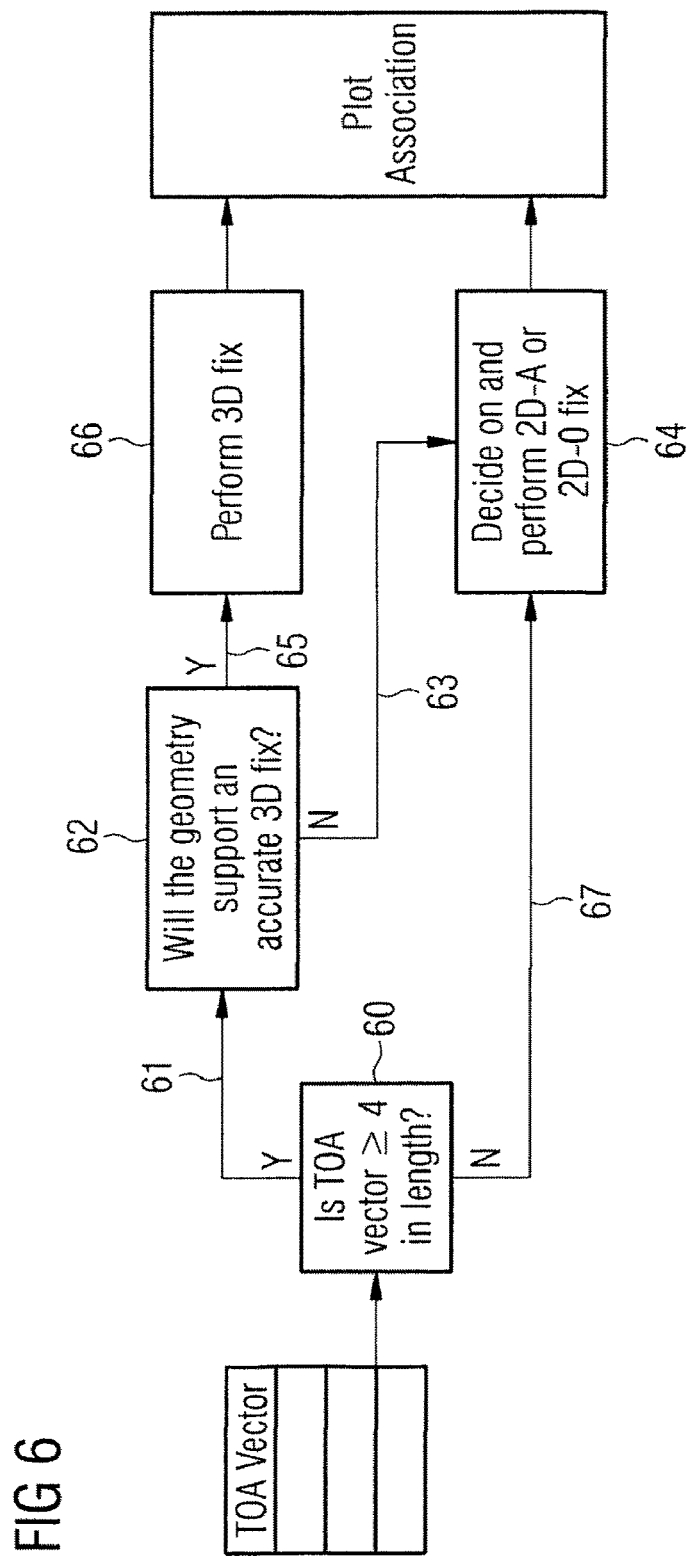
FIG. 6 illustrates vector consideration by the controller according to the invention.

The decision logic in locator 27 (FIG. 2) considers each vector in the manner illustrated in FIG. 6. The TOA vector is accessed and, in decision step 60, the vector length is considered. If the vector length is four returns or more then branch 61 is followed to the next step 62.

In step 62, the vector is considered and the receivers making the returns determined. It will be appreciated that even though four returns are available in a practical system these may not be ideally spread. Hence, if the geometry of the group of receivers providing the returns in the vector are not such as to give sufficient accuracy then a negative branch 63 is followed to step 64. If the geometry does offer sufficient accuracy then branch 65 is followed to step 66. In step 66 a full three dimensional multilateration is instructed.

Returning to step 60, if the vector length is less than four then negative branch 67 is followed to step 64. In step 64, a decision is made as to whether or not a two dimensional multilateration or an augmented two dimensional multilateration is to be performed using the barometric height indicated in a mode C emission. The step is divided into various choices dependent upon both the SSR code associated with the data input and the certainty of which type the code might be. The following cases exist:
1. Mode S
2. Mode A
3. Mode C
4. Either Mode A or C (i.e. not known which)

Note that military variants have been ignored for clarity.

Each of these cases has its own decision logic. The logic used is dependent upon the extent of information in the Track Table. The process is illustrated for three cases as shown in FIGS. 7a to 7d.

In FIG. 7a, the first case process is represented for an examination of the received code in which the code is a mode S code. In a first consideration step 70, the received code has an airframe address which is compared with the tracks in the track table 29 to see if the airframe address is already present as an entry. If it is, then the process follows branch 71 to the next consideration step 72 in which the track table is examined for the availability of the mode C altitude for the particular track. If the mode C altitude is present, then the branch 73 is followed and the next consideration step 74 made. In step 74, consideration is made as to whether or not the altitude is contained in the current mode S received code. If it is, then branch 75 is followed and the track is used in process 76 to perform a two dimensional multilateration using the altitude in the mode S code and the track in the track table is updated with the position in terms of x,y and z co-ordinates.

If in the step 74, the altitude is not contained in the current mode S then the negative branch 77 is followed to process 78. In this process a multilateration is performed with the altitude from the track table available from the last mode C return. The result is then passed to a matching process 79 which compares the result with one extrapolated for the track. If there is a match within a certain threshold, then the track in the track table is updated with the new position. If there is no match, then the negative branch 80 is followed to process 81. (In essence this will be because the received code is a new aircraft entering the air traffic control area.) The step 81 results in a multilateration process being performed at zero feet and the track table is updated to include a new track bearing a flag indicating that it is not to be output from the system as it has insufficient positional accuracy. This track will be updated as more codes are received and when the accuracy is acceptable the flag will be brought down permitting the track to be output from the system.

Returning back to step 70, if the airframe address is not present in the track table then negative branch 82 is followed to the step 74. If the altitude is contained in the current mode S code, then the positive branch 83 is followed to step 76. If the attitude is not contained then a negative branch 84 is followed to process 81.

Returning to step 72 if the result of the consideration of the mode C altitude being in the track table is negative then branch 85 is followed to step 74.

In step 78, the multilateration process is performed using the altitude in the track table. However in step 76 the multilateration process will be carried out on the basis of that in the current mode S code. The multilateration process to be applied whether 2d or 2d augmented is done with a consideration of the bandings of FIG. 5. If the altitude is between Hmin and H3d then a 2d assisted multilateration process is followed and a flag is added indicating reduced accuracy. If the altitude is below hmin then the multilateration process is a 2d process and the result is marked by a flag as full accuracy. If the altitude is above h3d then the locator does not provide an output and the track table is not updated.

Figure 7B:
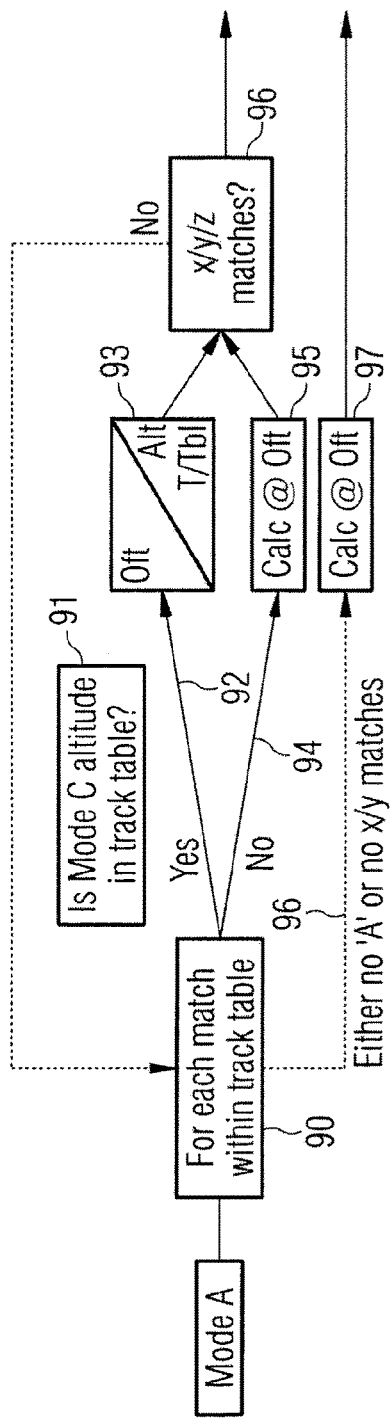

In case 2 shown in FIG. 7b the currently received code is a mode A code. This code is compared in step 90 with each track in the track table. The matches are then considered in turn in step 91 as to whether or not the track includes a Mode C altitude. If it does then branch 92 to process 93 is followed or if not branch 94 to process 95. If there are no matches then branch 96 is followed to process 97.

In process 93, the altitude is compared with the banding as before to select the multilateration process to be applied. If the altitude is between hmin and h3d then a 2d assisted multilateration process is applied using the altitude from the track table for the matching track flagging the result as reduced accuracy. If the altitude from the track table is below hmin then a 2d multilateration is performed marking the results as full accuracy. if the altitude is above h3d then there is no output from the locator.

In process 95 a 2d multilateration is carried out and the result flagged as not to be output from the system. The results for position from process 93 and 95 are passed to a comparison step 96. In this comparison step the position in terms of x,y and z co-ordinates is compared with an extrapolated position for the track. If there is a match the results are used to update the track in the track table if there is no match then the loop branch to the step 90 is followed. (Matching may be done in terms of x,y and z or x,y and a z determined from a mode C transmissions in some embodiments.)

In the case of no matches in the code or on the x, y, z co-ordinates in process 96, a 2d multilateration process is carried out and the results marked as not to be output from the system.

Figure 7C:
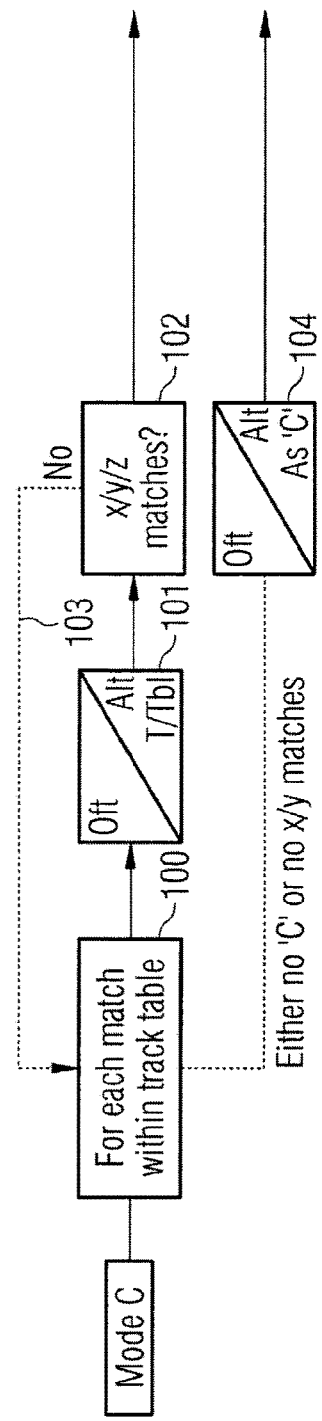
Figure 7D:
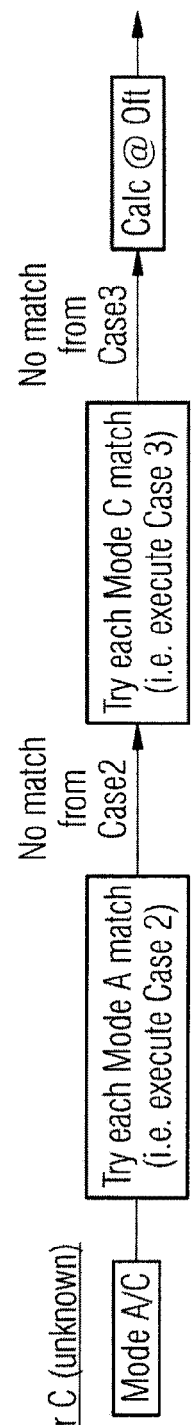

In the case of the received code being a mode C code the steps are shown in FIG. 7c. In a first step 100, the matches for the received code in the track table are identified. Then each match has a multilateration process 101 applied to it using the altitude from the track entry in the track table. If the altitude is between hmin and h3d then a 2D assisted multilateration is carried out with the results mark as reduced accuracy. If the altitude is below hmin then a 2d multilateration process is carried out and marked as full accuracy. If the altitude is over h3d then no output results from the locator. The resultant multilateration position is compared with process 102 to an extrapolated position for the particular track form the track table. If there is a match then the track is updated. If there is not a match, then the negative branch is followed back to the step 100.

If there are no matches for the code or co-ordinates then process step 104 is carried out for the received mode C code as it is being received from an aircraft entering the monitored airspace. In process 104 a 2d or 2d assisted multilateration process is carried out on the basis of the altitude in the received mode C code. In this process if the altitude is between hmin and h3d a 2d assisted multilateration process is carried out with the result marked as reduced accuracy. If the altitude is below hmin then a 2d multilateration process is carried out and the results marked as full accuracy. If the height is above h3d then there is no output from the locator.

The 3D multilateration process will involve four or more of the receivers as disclosed in GB225014 or GB 239531 for example. However, if the altitude is known, only two time difference of arrival figures need be determined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A multilateration system comprising:
   a plurality of receiver stations for receiving a signal from an aircraft; and
   a controller that derives the position of the aircraft by applying a multilateration process to outputs of the receiver stations, which outputs indicate receipt of said signal, wherein the controller determines
   i) determines an altitude of the aircraft;
   ii) chooses a multilateration process based on the determined altitude; and
   iii) performs the chosen multilateration process to provide a position of the aircraft.

2. The system as claimed in claim 1, wherein the controller performs the multilateration process using said outputs of the stations and the altitude of the aircraft.

3. The system as claimed in claim 1, wherein:
   the controller uses said outputs to create a track for the aircraft; and
   said track is stored in a memory.

4. The system as claimed in claim 3, wherein the track comprises at least one of a mode type indicator, a mode code, and a position.

5. Currently Amended) The system as claimed in claim 3, wherein:
   the controller comprises a locator having logic for comparing i) a currently determined position provided by the chosen multilateration process with ii) a predicted position extrapolated from a track; and
   if comparison is within a certain threshold, the logic concludes that there is a match and updates the track with the currently determined position.

6. The system as claimed in claim 1, wherein:
   the controller comprises a locator having control logic for i) determining the number of receiver stations providing usable outputs, ii) determining from the outputs the geometry of the receiver stations making the outputs and whether the geometry will support a three dimensional multilateration, and iii) carrying out such a multilateration; and
   in the absence of such a determination the control logic carries out a two dimensional or two dimensional augmented multilateration.

7. An air-traffic control system for monitoring air-traffic, said air-traffic control system comprising:
   a multilateration system that includes a plurality of receiver stations for receiving a signal from an aircraft; and a controller that derives the position of the aircraft by applying a multilateration process to outputs of the receiver stations, which outputs indicate receipt of said signal, wherein the controller i) determines an altitude of the aircraft; ii) chooses a multilateration process based on the determined altitude; and iii) performs a chosen multilateration process to provide a position of the aircraft;
   means for displaying at least some of track information provided by the chosen multilateration system to a system operator.

8. A multilateration method of determining the position of an aircraft emitting a code, said method comprising:
   receiving the code at a plurality of receiver stations; and
   deriving a position of the aircraft by applying a multilateration process to outputs of the receiver stations;
   wherein said step of deriving a position of the aircraft comprises,
   determining an altitude of the aircraft;
   choosing a multilateration process based on the determined altitude; and
   performing the chosen multilateration process to provide the position of the aircraft.

9. The method as claimed in claim 8, wherein the altitude is a barometric altitude obtained from a received code.

10. A method as claimed in claim 8, wherein said step of choosing a multilateration process comprises comparing the determined altitude with threshold values to determine the multilateration process.

11. A method as claimed in claim 8, wherein data contained in said outputs of said receiver stations are stored as tracks.

12. The method as claimed in claim 11, further comprising:
- comparing a current position provided by the chosen multilateration process with extrapolated positions from the tracks to determine a match; and
- in the event of a match, updating the track with the current position.

13. The air-traffic control method comprising determining aircraft positions using a method as claimed in claim 8, and displaying the aircraft positions to an operator.

* * * * *